(12) United States Patent
Biederman et al.

(10) Patent No.: US 12,346,280 B2
(45) Date of Patent: Jul. 1, 2025

(54) MULTI-PORT MEDIA ACCESS CHANNEL (MAC) WITH FLEXIBLE DATA-PATH WIDTH

(71) Applicant: Intel Corporation, Santa Clara, CA (US)

(72) Inventors: Daniel Biederman, Saratoga, CA (US); Aniket A Aphale, Bangalore (IN); Sharvil Desai, Ahmedabad (IN); Matthew James Webb, Woodland Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/770,975

(22) Filed: Jul. 12, 2024

(65) Prior Publication Data

US 2024/0394207 A1    Nov. 28, 2024

Related U.S. Application Data

(63) Continuation of application No. 16/986,133, filed on Aug. 5, 2020, now Pat. No. 12,045,188.

(51) Int. Cl.
  *G06F 13/40*    (2006.01)
  *G06F 11/10*    (2006.01)
  *H04J 3/02*    (2006.01)

(52) U.S. Cl.
  CPC ...... *G06F 13/4031* (2013.01); *G06F 11/1004* (2013.01); *H04J 3/02* (2013.01)

(58) Field of Classification Search
  None
  See application file for complete search history.

(56) References Cited

U.S. PATENT DOCUMENTS

| | | | |
|---|---|---|---|
| 6,732,126 B1 * | 5/2004 | Wang | G06F 7/57 |
| | | | 708/518 |
| 8,244,640 B2 * | 8/2012 | Venkatachalam | G06Q 50/60 |
| | | | 705/52 |

(Continued)

OTHER PUBLICATIONS

"IEEE Standard for Ethernet," LAN/MAN Standards Committee of the IEEE Computer Society, IEEE Std 802.3-2018 (Revision of IEEE Std 802.3-2015), The Institute of Electrical and Electronics Engineers, Inc., 3 Park Avenue, New York, NY 10016-5997, USA, 5600 pgs.

(Continued)

*Primary Examiner* — Daniel F. McMahon
(74) *Attorney, Agent, or Firm* — Essential Patents Group, LLP; Christopher K. Gagne

(57) ABSTRACT

Multi-port Media Control Channel (MAC) with flexible data-path width. A multi-port receive (RX) MAC block includes multiple RX ports and a plurality of RX circuit blocks comprising an RX MAC pipeline for performing MAC Layer operations on RX data received at the RX ports. The RX circuit blocks are connected with variable-width datapath segments, and the RX MAC block is configured to implement a multi-port arbitration scheme such as a TDM (Time-Division Multiplexed) scheme under which RX data received at a given RX port are forwarded over the variable-width datapath segments using datapath widths associated with that RX port. A multi-port transmit (TX) MAC block implementing a TX MAC pipeline comprising TX circuit blocks connected with variable-width datapath segments is also provided. The RX and TX MAC blocks include CRC modules configured to calculate CRC values on input data received over datapaths having different widths.

30 Claims, 15 Drawing Sheets

(56) References Cited

U.S. PATENT DOCUMENTS

| | | | | |
|---|---|---|---|---|
| 8,397,034 | B1* | 3/2013 | Rezeanu | G11C 7/1075 |
| | | | | 711/152 |
| 8,479,069 | B2* | 7/2013 | Miller | G06F 11/221 |
| | | | | 370/254 |
| 2011/0235635 | A1* | 9/2011 | Yadav | H04Q 11/0067 |
| | | | | 398/58 |
| 2014/0146763 | A1* | 5/2014 | Khay-Ibbat | H04W 28/0268 |
| | | | | 370/329 |
| 2015/0180677 | A1* | 6/2015 | Logvinov | H04L 12/40032 |
| | | | | 370/392 |
| 2016/0364835 | A1* | 12/2016 | Srebnik | G06F 12/0842 |
| 2019/0037001 | A1* | 1/2019 | Fujishiro | H04L 65/10 |

OTHER PUBLICATIONS

Non-Final Office Action from U.S. Appl. No. 16/986,133 notified Sep. 14, 2023, 17 pgs.

Notice of Allowance from U.S. Appl. No. 16/986,133 notified Mar. 22, 2024, 9 pgs.

Panic, G. et al., "A system-on-chip implementation of the IEEE 802.11a MAC layer," Euromicro Symposium on Digital System Design, 2003, Proceedings, Belek-Antalya, Turkey, 2003, pp. 319-324, doi: 10.1109/DSD.2003.1231962.

* cited by examiner

| Number of Ports | Speed | Total Bandwidth | Bus width (Bytes) | Number of free cycles between data |
|---|---|---|---|---|
| 1 | 400G | 400G | 64 | Data Every Cycle |
| 1 | 200G | 200G | 64 | Data Every 2 Cycles |
| 2 | 200G | 400G | 64 | Data Every Cycle (port 1 - 50%, port 2 - 50%) |
| 1 | 200G | 200G | 32 | Data Every 2 Cycle |
| 4 | 50G | 200G | 64 | Data Every Cycle |
| 2 | 50G | 100G | 32 | Data every cycle |
| 2 | 50G | 100G | 64 | Data every 2 cycles (50%-50%) |
| 1 | 100G | 100G | 16 | Data every cycle |
| 1 | 100G | 100G | 32 | Data every 2 cycles (50%-50%) |
| 1 | 100G | 100G | 64 | Data every 4 cycles (4*25%) |
| 1 | 50G | 50G | 16 | Data every 2 cycles |
| 2 | 50G | 100G | 16 | Data every cycle |
| 2 | 50G | 100G | 32 | Data every 2 cycles |

*Fig. 3a*

| Number of Ports | Speed | Total Bandwidth | Bus width (Bytes) | Number of free cycles between data |
|---|---|---|---|---|
| 1 | 200G | 200G | 32 | Data Every Cycle |
| 1 | 100G | 100G | 32 | Data Every 2 Cycles |
| 2 | 100G | 200G | 32 | Data Every Cycle (port 1 -50%, port 2 – 50%) |
| 1 | 100G | 100G | 16 | Data Every 2 Cycle |
| 4 | 50G | 200G | 32 | Data Every Cycle |
| 2 | 50G | 100G | 16 | Data every cycle |
| 2 | 50G | 100G | 32 | Data every 2 cycles (50%-50%) |
| 1 | 50G | 50G | 8 | Data every cycle |
| 1 | 50G | 50G | 16 | Data every 2 cycles (50%-50%) |
| 1 | 50G | 50G | 32 | Data every 4 cycles (4*25%) |
| 1 | 25G | 25G | 8 | Data every 2 cycles |
| 2 | 25G | 50G | 8 | Data every cycle |
| 2 | 25G | 50G | 16 | Data every 2 cycles |
| 4 | 10G | 40G | 16 | Data every 4 cycles |

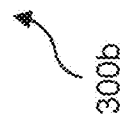

*Fig. 3b*

2 Ports (1x100G and 1x50G)

| Port | TDM Slot 1 | 2 | 3 | 4 | 5 | 6 |
|---|---|---|---|---|---|---|
| 100G | 32B | | 32B | | 32B | |
| 50G | | 16B | | 16B | | 16B |

*Fig. 4a*

3 Ports (1x100G and 2x25G)

| Port | TDM Slot 1 | 2 | 3 | 4 | 5 | 6 | 7 | 8 |
|---|---|---|---|---|---|---|---|---|
| 100G | 32B | | 32B | | 32B | | 32B | |
| 25G | | 16B | | | | 16B | | |
| 25G | | | | 16B | | | | 16B |

*Fig. 4b*

4 Ports (1x100G and 3x25G)

| Port | TDM Slot 1 | 2 | 3 | 4 | 5 | 6 | 7 | 8 |
|---|---|---|---|---|---|---|---|---|
| 100G | 32B | | 32B | | 32B | | 32B | |
| 25G | | 16B | | | | | | 16B |
| 25G | | | | 16B | | | | |
| 25G | | | | | | 16B | | |

*Fig. 4c*

MULTI-PORT MEDIA ACCESS CHANNEL (MAC) WITH FLEXIBLE DATA-PATH WIDTH

RELATED APPLICATION

This application is a continuation of U.S. patent application Ser. No. 16/986,133, filed Aug. 5, 2020. The entire specifications of which are hereby incorporated herein by reference in their entirety.

BACKGROUND INFORMATION

Packet processing entails several data processing and conversion operations. To support high-speed links, operations at the Physical (PHY) Layer and Media Access Control (MAC) Layer are performed in hardware. On the receive (RX) side, the RX PHY performs conversion of electrical or optical signals into digital data using a sequence of processes including processes to reduce errors, such as Forward Error Correction (FEC). For protocols such as Ethernet, the RX MAC receives the output of the RX PHY and performs operations to extract frames of data and performs an error check using a cyclic redundancy check (CRC) that is calculated over received data frames and then compared with an Frame Check Sequence (FCS) value appended at the end of the frame. On the transmit (TX) side, the TX MAC and TX PHY perform similar operations to the RX MAC and RX PHY, except in reverse order.

High-speed communication dictates low latency. Higher speed MACs require more throughput. Most people measure latency as the time the SOP (Start of Packet) enters the MAC, to the time the SOP exits the MAC. The wider the data bus, the longer it takes. For example, a 5-stage MAC pipeline with a 1-byte datapath, the latency would be the time for 1 byte to enter the MAC, plus 5 clocks (1 per stage) to perform the MAC logic. However, a 400G Mac (i.e., supporting a link bandwidth of 400Gb/sec) may require a 64B (Byte) or 128B datapath. In such a case, the latency would be the time for 64B (or 128B) to enter the MAC plus 5 clocks (1 per stage) to exit the MAC. The time to collect the 64B or 128B depends on the speed of the link. At 400G, that speed is very quick. However, at slower link speeds like 1G, 2.5G, 5G, and 10G, the time is much longer. For example, a 1G link takes 400 times longer than 400G link, and a 10G link take 40 times longer than 400G. Even 25G is 16 times longer than 400G. In a cut-thru network, such latencies are undesirable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3a is a table showing different combinations of ports, link speeds, total bandwidth, bus widths, and number of free cycles between data for one embodiment of a 400G RX MAC;

FIG. 3b is a table showing different combinations of ports, link speeds, total bandwidth, bus widths, and number of free cycles between data for one embodiment of a 200G RX MAC;

FIG. 4a is a table showing TDM slot assignments for a 2-port MAC including a 100G link and a 50G link;

FIG. 4b is a table showing TDM slot assignments for a 3-port MAC including a 100G link and two 25G links;

FIG. 4c is a table showing TDM slot assignments for a 4-port MAC including a 100G link and three 25G links;

DETAILED DESCRIPTION

Figure 1A:
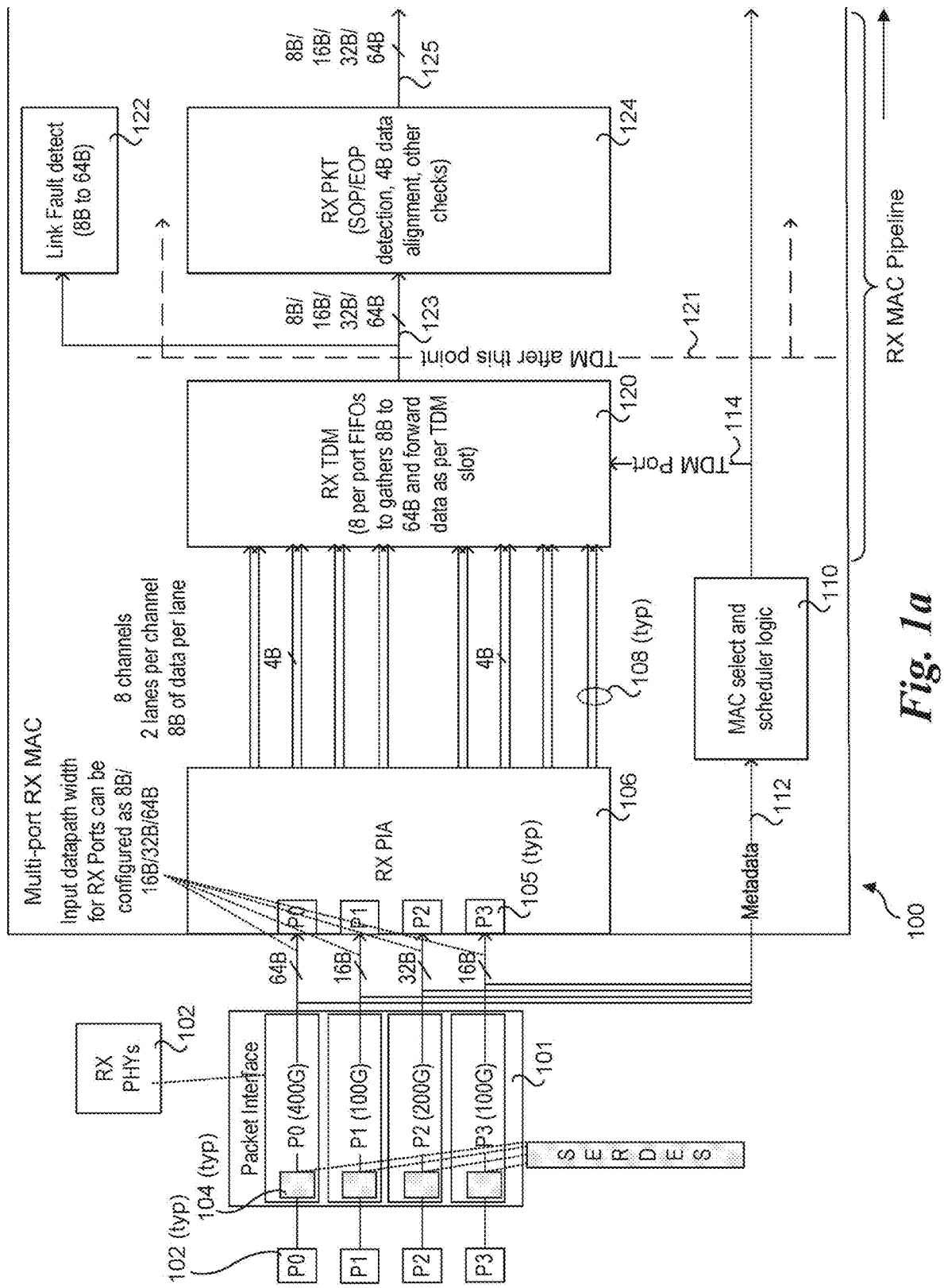
FIGS. 1a and 1b are schematic diagrams collectively illustrating a 400G multi-port RX MAC, according to one embodiment.

Embodiments of multi-port MACs with flexible data-path width are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

One way to address the MAC latency problems is to provide interconnect circuitry and circuit blocks that are designed for specific datapaths (e.g., circuitry for an 8B, 16B, 32B, 64B, etc.) However, this approach requires separate sets of circuitry for each datapath width that is to be supported, which would consume valuable real estate and increase power.

The embodiments disclosed herein address this problem by providing a flexible datapath scheme that supports multiple datapath widths using shared sets of circuit blocks in the RX MAC and TX MAC pipelines. Depending on the speed of the link (and thus the speed to be matched by the MAC) the datapath width is adjusted to allow the lowest possible latency at a given frequency. In some embodiments, the associated datapath widths to be used for MAC processing of RX and TX data are assigned using a TDM (Time-Division Multiplexing) scheme.

Figure 1B:
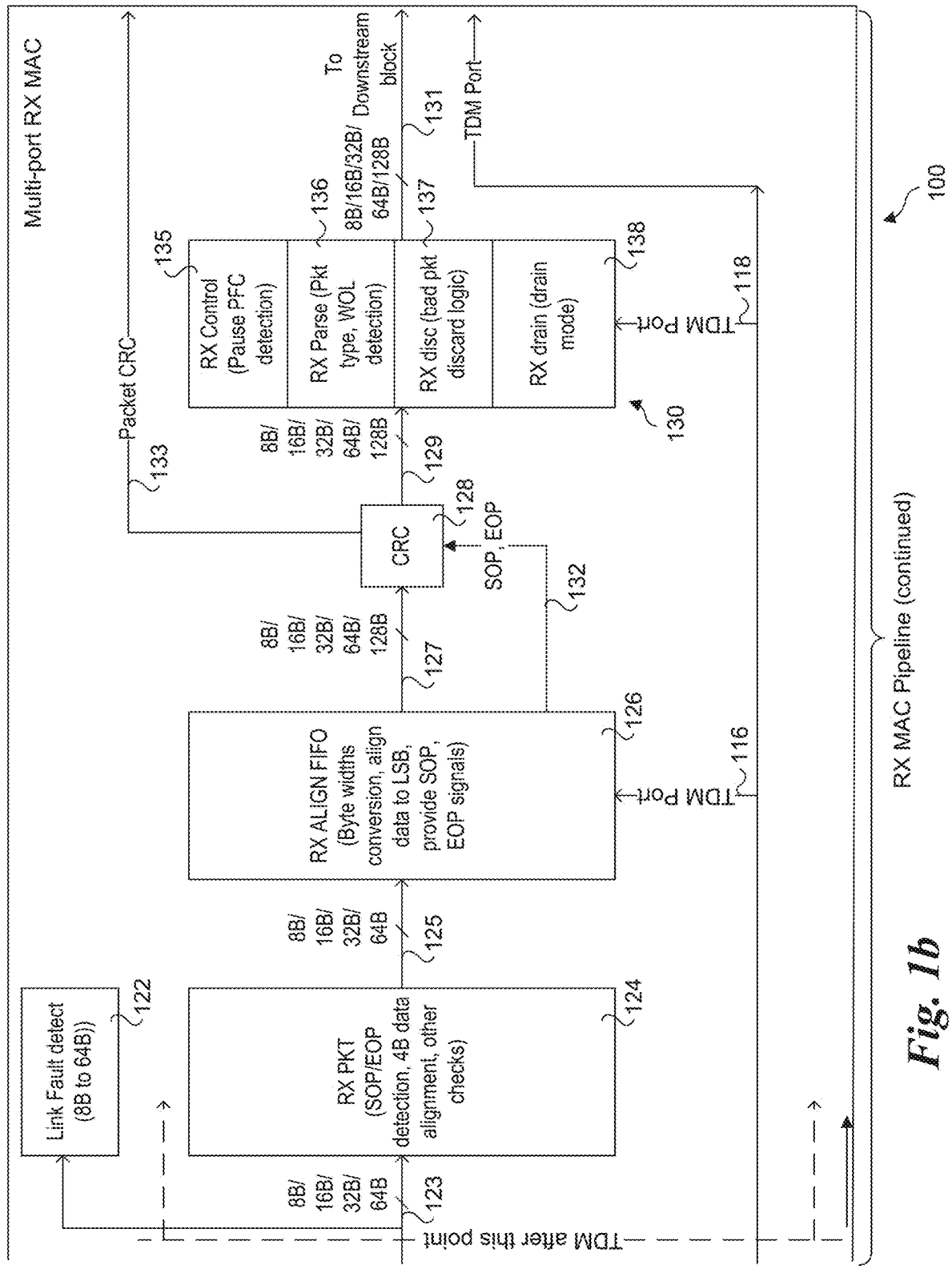

FIGS. 1a and 1b collectively show an embodiment of a 400G multi-port RX MAC 100 that implements a flexible datapath. In this example, a Packet Interface (P1) 101 includes four network ports 102 (labeled P0, P1, P2, and P3) respectively having link bandwidths of 400G, 100G, 200G, and 100G. RX PHY processing for data received at each of network ports P0, P1, P2, and P3 is implemented in a respective RX PHY 102. The links and their associated PHYs may include various types of links including but not limited to electrical links employing wired cabled and wire traces and optical links. The links and associated PHYs may also employ different protocols, including but not limited to Ethernet. For embodiments employing Ethernet links, the PHY parameters are specified by an existing or draft IEEE 802.3 standard.

Current 100G, 200G, and 400G links transmit data serially over a single lane or multiple lanes. As part of the PHY processing, after conversion into digital form the received serial data is converted into parallel data using SERDES (Serializer/Deserialize) blocks 104. As shown, the RX PHY for the 400G link for port P0 outputs data over a 64B datapath, the RX PHY for the 200G link for port P2 outputs data over a 32B datapath, and the RX PHYs for the 100G links for ports P1 and P2 output data over a 16B datapath.

The RX data output from the RX PHYs for ports P0, P1, P2, and P3 are respectively received at RX ports 105 (P0, P1, P2, and P3) of an RX Packet Interface Adaptor (PIA 106), which comprises the RX-side interface for multi-port RX MAC 100. RX PIA 106 multiplexes the data received at RX ports 105 onto 8 channels 108, with two 4B lanes per channel and 8B per lane. Thus, the total width of the datapath comprising the 8 channels is 64B, the same width as used for the 400G link at RX port P0. In some embodiments, RX PIA 106 is also used to perform clock conversion between the clock frequency used by packet interface 101 and the clock frequency used by multi-port RX MAC 100.

In some embodiments, RX ports 105 of RX PIA 106 have fixed datapath widths. For example, this will be the case for combined MAC/PHY chips, since the PHYs will output data using datapaths that are associated with the speeds and protocols for the communications links to which the MAC/PHY chip would be connected. Alternatively, the input datapaths widths for RX ports 105 are flexible and may be configured based on the PHYs to which the RX ports may be connected. For example, as shown in FIG. 1a, the input datapath width may be configured as 8B, 16B, 32B, or 64B, depending on datapath width needed by the PHY to which a given RX port is connected.

The number of channels that are used will vary with the input datapath width for the link. For example, for the 400G link connected to port P0, the datapath width is 64B, and thus all 8 channels are used. For ports P1 and P3 (100G, 16B datapath), 2 channels are used, while three channels are used for port P2 (200G, 32B datapath). The use of the nomenclature "400G" multi-port RX MAC indicates this embodiment of a multi-port RX MAC supports a total bandwidth of 400 Gb/s across the multiple communication links (e.g., P0 @400G, P1 and P3 @200G, and P2 @100G in this example). Thus, the following combinations of ports could be used: P0, P1, P2, or P3 (only), P1+P2, P2+P3, or P1+P2+P3. Generally, a 400G MAC may be configured to support a variety of other link combinations, such as 2×@200G, 4×@100G, 1×@200G+1×@100G+2×@50G, etc.

An aspect of the embodiments herein is the use of TDM. When data is received over multiple links (concurrently), to share the MAC datapath and circuit blocks a TDM scheme is used such that data from one link (and the link's associated RX port) is processed at a time. This is supported, in part, via MAC select and scheduler logic 110 and metadata 112. The TDM scheme assigns port-based TDM "slots" for the active ports using TDM port input signals to applicable RX MAC circuit blocks. For example, in the embodiment shown in FIGS. 1a and 1b MAC select and schedular logic 110 provides TDM port input signals 114 (FIG. 1a), 116 and 118 (FIG. 1b) based on a predefined TDM slot assignment scheme. Several examples of TDM slot assignments for a 200G multi-port RX MAC are shown in FIGS. 4a, 4b, and 4c and described below.

In an RX TDM block 120, 8 per port FIFOs (First-In First Out buffers) are used to gather 8B to 64B worth of data for a given TDM slot and forward the data per the TDM slot. Under the embodiment of FIGS. 1a and 1b, a TDM slot corresponds to a MAC clock cycle under which a respective stage in the pipeline is implemented during a respective MAC clock cycle.

As depicted by a dashed line 121, all variable-width datapath segments shown to the right of line 22 are employ configurable datapath widths that are selected using the TDM slots. For example, the widths for variable-width datapath segments 123 and 125 are depicted as 8B, 16B, 32B, and 64B, and the widths for variable-width datapath segments 127, 129, and 131 are depicted as 8B, 16B, 32B, 64B and 128B. For example, variable width datapath segment 123 comprises an interconnects with 512 parallel paths (corresponding to a datapath width of 64B), with a portion of the 512 parallel paths used for the 8B, 16B, and 32B datapaths when those paths are to be applied for a given TDM slot. Selection/control of the different datapath widths is implemented through the combination of the TDM port signals and multiplexer circuitry (not separately shown) in applicable circuit blocks in the RX MAC pipeline.

In a block 122, link fault detection is performed. If a link fault is detected the MAC will enter a link fault state. For Ethernet MACs, handling of the link fault state is provided by a Link Fault state machine defied in an applicable IEEE 802.3 standard (based on the link speed and type).

An RX packet block 124 is used to detect SOP and EOP (end of packet), perform 4B data alignment, and other checks). The output datapath width of RX packet block 124 will match the input datapath width (e.g., one of 8B, 16B, 32B, and 64B in the illustrated embodiment).

Continuing at the left side of FIG. 1b, following the operations performed by RX packet block 124 the next stage in the RX MAC pipeline is performed by an RX alignment FIFO 126, which performs Byte width conversion, aligns data to the Least Significant Bit (LSB), and provides SOP and EOP signals 132. The Byte width conversion converts the incoming byte width to the outgoing byte width based on its programming. That programming could be based on the ports line rate, all ports line rate, number of ports, number of TDM slots used, etc.) As further shown, the operations of RX alignment FIFO 126 are synchronized by a TDM port input 116.

As shown on the output side of RX alignment FIFO 126, the datapath widths further include a 128B datapath when Byte width conversion is applied to 64B input data. For example, In the case of 400G RX MAC having a clock frequency of approximately 900 MHZ, the data from the PHY can have an SOP and EOP in the same flit. However, after this block, the flit should contain only one SOP or one EOP (i.e. a flit cannot share data from two packets). Hence the datapath width is changed to allow the second packet to be inserted at the next time, and still have the necessary bandwidth. Note at a higher, different speed, you might be able to have a 96B bus instead of a 128B bus.

The next stage is a multi-port cyclic redundancy check (CRC) module 128. Multi-port CRC module 128 calculates a running CRC value for each packet as the data for that packet are processed by the MAC pipeline, and outputs a packet CRC 133. As described in further detail below, the circuitry in multi-port CRC module 128 is configured to enable calculation of CRC values using different datapath widths while during a MAC clock cycle (and associated TDM port input signaling) for packets that are received over links employing different bandwidths.

As depicted in an RX circuit block 134, there are multiple operations performed in the last stage on the RX MAC pipeline. The sub-blocks of RX circuit block 134 include an RX control block 135, an RX parse block 136, and RX discard block 137, and an RX drain block 138. RX control block 135 is configured to pause upon detection of a Priority-based Flow Control (PFC) for a flow. For example, IEEE 802.1bb defines provides a link-level flow control mechanism that can be controlled independently for each class of service (CoS), as defined by IEEE P802.1p and is applicable to data center bridging (DCB) networks, and to allow for prioritization of voice over IP (VOIP), video over IP, and database synchronization traffic over default data traffic and bulk file transfers. Another flow control mechanism is the pause frame defined by IEEE 802.3. Upon detection of an RX control condition, RX control block 135 pauses the stream and performs "Wake on LAN" (WOL) aggregation, where WOL is the standard Wake on LAN protocol RX parse block 136 parses the input data to identify packet type and to perform WOL detection. RX discard block 137 implemented logic for discarding bad packets. RX drain block 138 implements an RX drain mode. For example, if the next block is not ready, or if there is an error, the MAC can chose to drain the packet/error instead of passing it along to the next block. For Ethernet traffic, the output of RX circuit block 134 is forwarded to a downstream block, such as a packet buffer (not shown). The outputs of Multi-port RX MAC 100 include packet CRC 133 and the TDM port signal.

In some embodiments, the downstream block may have only the number of bits required to be connected. Optionally, the data interface from RX circuit block 134 may fan-out to different ports/port widths using the TDM port signal. In some cases, to reduce latency, parallel paths can be added to avoid possible delays added by the TDM structure.

Figure 2:
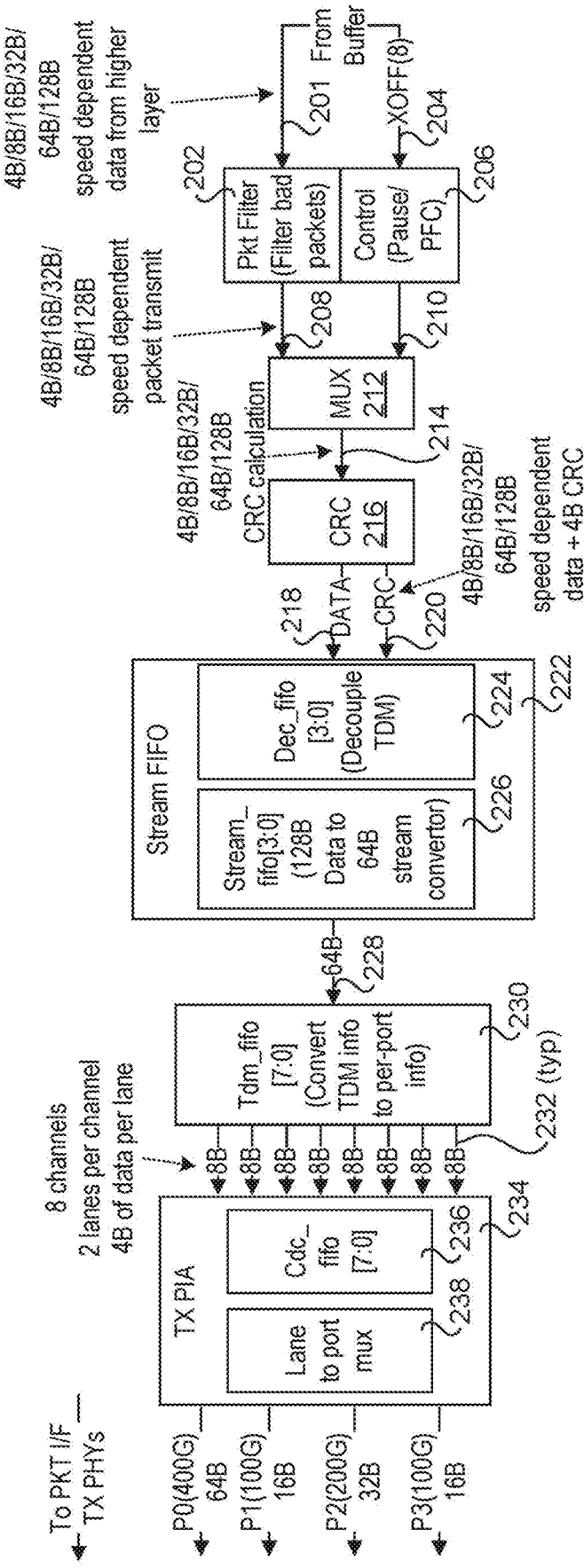
FIG. 2 is a schematics diagram of a 400G multi-port TX MAC, according to one embodiment.

FIG. 2 shows an embodiment of a 400G TX MAC 200 that supports multiple datapaths, according to one embodiment. Like multi-port RX MAC 100, the TX MAC 200 employs variable-width datapath segments to support flexible input data widths. The input data width could have a fixed width for all sizes, or it could be variable based on the incoming port/TDM slot. An enable signal could follow the data, through the datapath to indicate which bytes are valid. For Ethernet, the TX circuit blocks coupled via the datapath segments are configured per TDM slot to receive and output variable sizes required by the design's frequency, Ethernet rate, and latency of each port. In a manner similar to the RX MAC pipeline, in some stages to reduce latency, parallel paths can be added to avoid possible delays added by the TDM structure. In some embodiments, the portion(s) of the datapath (and/or datapath segments) that is/are not used during a TDM slot may be clock-gated to save power.

The TX MAC multi-stage process flows from right to left, beginning on the right side of FIG. 2 with data 200 coming from a buffer that is received at a packet filter block 202 that filters for bad packets. As shown, the width of the datapath throughout the portion of the flow between the buffer and stream FIFO 222 is 4B, 8B, 16B, 32B, 64B, or 128B depending on the speed of the output port to be transmitted from and the TDM slot.

In parallel with the transfer of data 200, the process employs an 8-bit XOFF signal 204 that is used in a control block 206 for priority flow control and/or pausing of packet flows. Respective outputs 208 from packet filter block 202 and 210 from control block 206 are input to a multiplexer (MUX) 212. The output 214 of MUX 212 is input to a multi-port CRC module 216 that is configured to perform CRC calculations, as described below in further detail.

Multi-port CRC module 216 outputs data 218 plus a 4B (32-bit) CRC 220 that is received by stream FIFO 222. Stream FIFO 222 includes a 4-bit Dec_fifo 224 used to decouple from the TDM timing and a 4-bit Stream_fifo 226, which operates as a 128B to 64B stream convertor.

Stream FIFO 222 forwards 64 Bytes of data using a 64B wide datapath 228 to an 8-bit TDM FIFO 230, which converts the TDM information to per-port information. The output of TDM FIFO 230 is data that is transferred over 8 channels having 2 lanes per channel and 4B of data per lane 232. The 8 channels of 8B of data is received by a 4B/8B/16B/32B/64B PIA 234 including a Cdc_fifo 236 and a lane to port multiplexer 238. The output of TX PIA 234 is provided to the TX PHYs in the packet interface. In the embodiment illustrated in FIG. 2, the ports are P0 (400G, 64B), P1 (100G, 16B), P2 (200G, 32B) and P3 (100G, 16B).

As with the RX ports on the input side of an RX MAC, the TX ports on a the output side of a TX MAC may have fixed datapath widths or may employ flexible configurable datapath widths. For example, for a 400G TX MAC, in one embodiment the flexible datapath widths include 8B, 16B, 32B, and 64B. In one embodiment of a 200G TX MAC (see FIG. 2a and accompanying discussion below), the flexible datapath widths include 8B, 16B, and 32B.

Figure 1C:
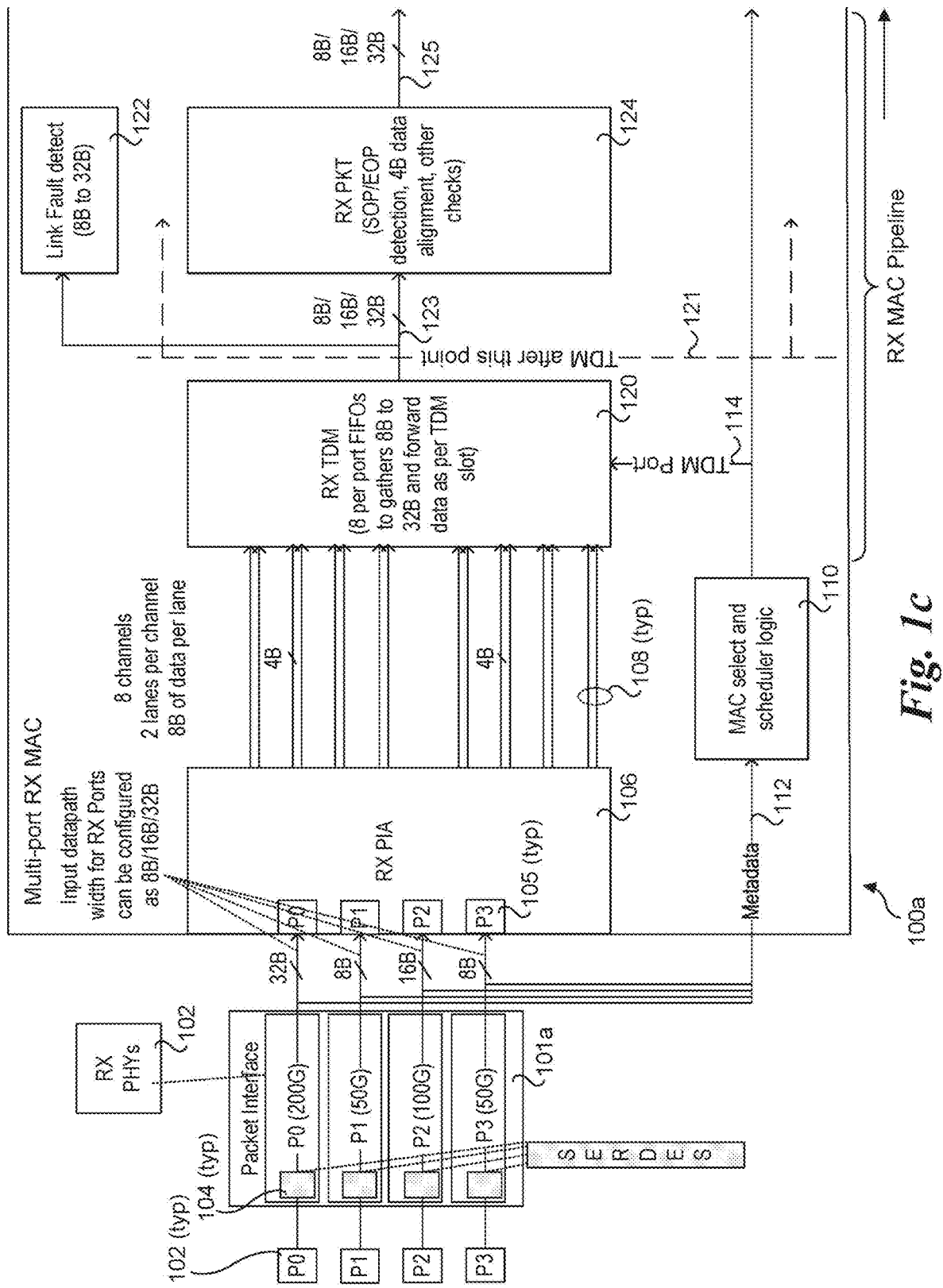
FIGS. 1c and 1d are schematic diagrams collectively illustrating a 200G multi-port RX MAC, according to one embodiment.
Figure 1D:
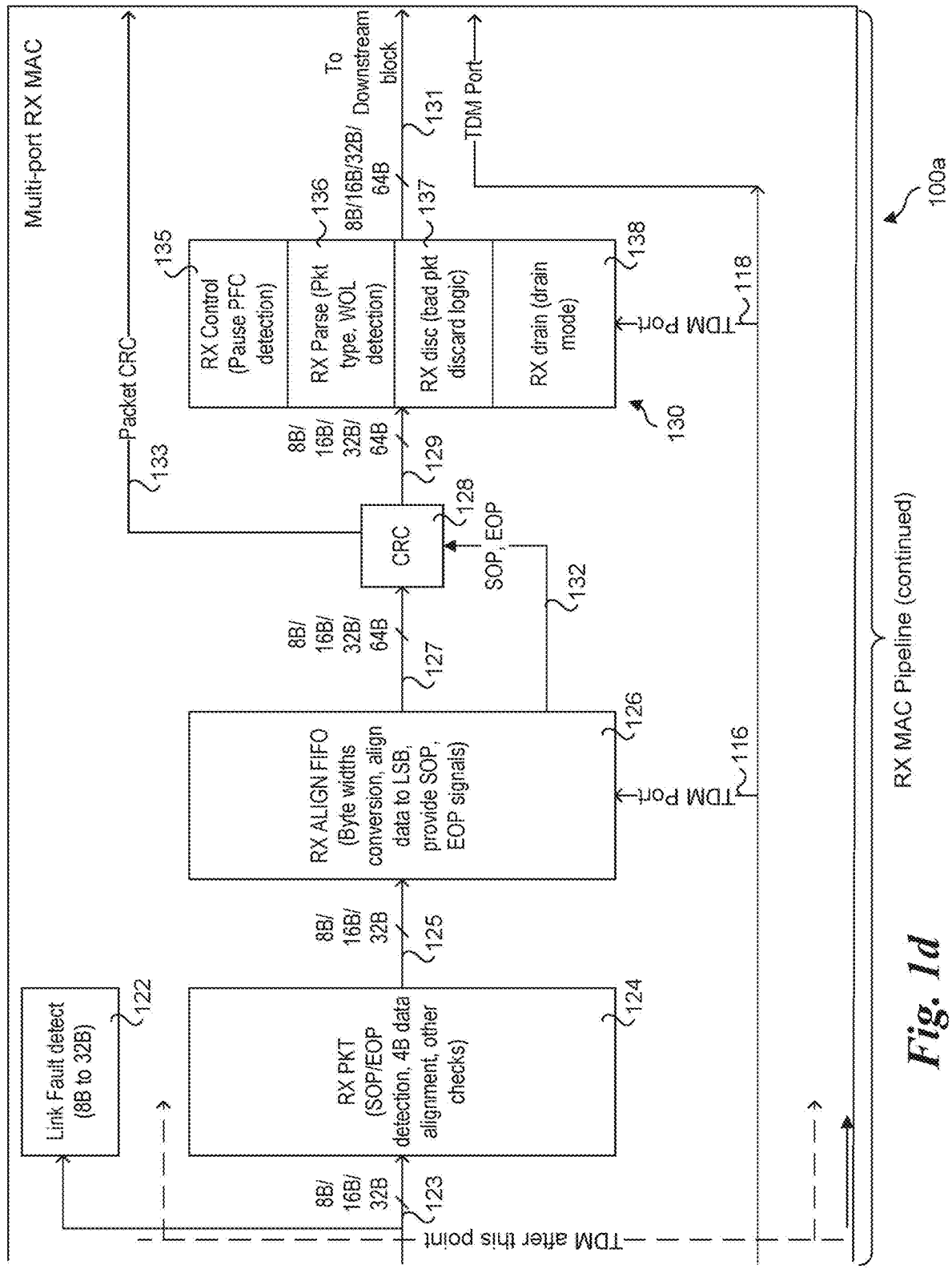

FIGS. 1c and 1d collectively show an embodiment of a 200G multi-port RX MAC 100a that implements a flexible datapath. Generally, the blocks and circuitry for 200G multi-port RX MAC 100a are similar to those shown in the 400G multi-port RX MAC 100 of FIGS. 1a and 1b, except for differences in the links, PHY blocks, and associated datapath widths. For instance, for ports 102, port P0 is coupled to a 200G link, ports P1 and P3 are coupled to 50G links, and port P2 is coupled to a 100G link. Corresponding blocks and circuitry are used to perform RX MAC operations using RX data received at these ports, with a total bandwidth of 200G. The datapath widths are 8B, 16B, and 32B prior to RX align FIFO 126, and 8B, 16B, 32B, and 64B afterwards.

Figure 2A:
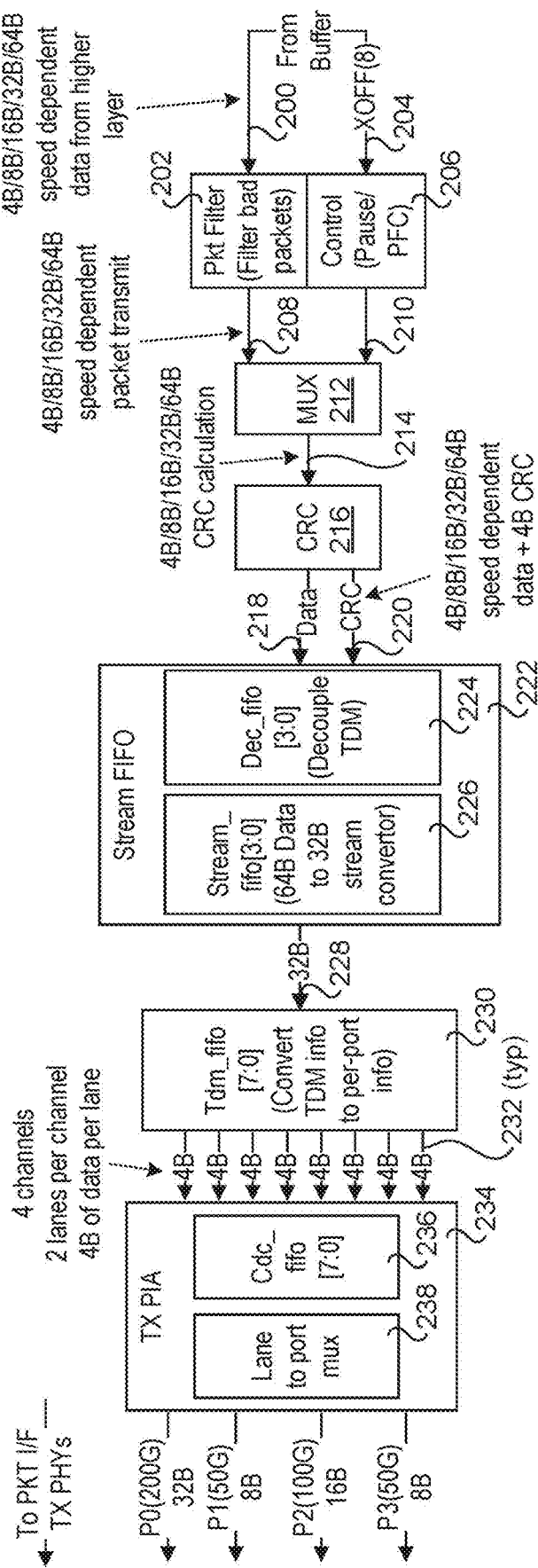
FIG. 2a is a schematics diagram of a 200G multi-port TX MAC, according to one embodiment.

An embodiment of an associated 200G TX MAC 200a is shown in FIG. 2a. As with 200G RX MAC 100a, the output TX ports from the TX MAC are 200G for P0, 50G for P1 and P3, and 100G for P2. The datapath widths are 4B, 8B, 16B, 32B and 64B up to stream FIFO 222, which performs a 64B to 32B conversion. The output of Tdm_fifo 230 is 4 channels with 2 lanes per channel and 4B of data per lane.

Table 300a in FIG. 3a shows different combinations of ports, link speeds, total bandwidth, bus widths, and number of free cycles between data for one embodiment of a 400G RX/TXMAC. In some cases, different bus width and data cycles may be used for the same port configuration. For example, when using a single 200G port either a 64B width may be used with data every 2 cycles, or a 32B width with data every cycle. Table 300b in FIG. 3b shows different combinations of ports, link speeds, total bandwidth, bus widths, and number of free cycles between data for one embodiment of a 200G RX/TX MAC.

Example TDM Slot Assignments and Datapath Widths

FIGS. 4a, 4b, and 4c show exemplary TDM slot assignments and associated datapath widths for respective 2 port, 3 port, and 4 port embodiments for a 200G RX/TX MAC. For example, FIG. 4a shows TDM slots for a 2-port configuration including a 100G port and a 50G port. The 100G and 50G ports are assigned alternating TDM slots using 32B and 16B datapath widths. FIG. 4b shows a 3-port configuration including a 100G port and two 25G ports. In this example, every other TDM slot is assigned for the 100G port while the remaining TDM slots are assigned to the 25G ports in an alternating manner under which each 25G port gets assigned every fourth TDM slot. Under the 4-port configuration in FIG. 4C, the 100G port is assigned every other slots, with the remaining slots assigned to the three 25G ports in an alternating manner such that each 25G port is assigned every sixth TDM slot.

Variable-Width Datapath CRC Implementation

In accordance with an aspect of the embodiments herein, a novel CRC calculation mechanism is provide via a multi-port CRC module capable of doing one CRC calculation per port per clock cycle on a TDM bases with a variable input data width per port. To better understand how the multi-port CRC module may be implemented, a primer on CRC calculations is first provided.

CRC is used for data error-detection and is well-suited for detecting burst errors on high-speed communication links. An n-bit CRC will detect any single burst error up to n bits long, and will detect most longer error bursts (probability=$1-2^{-n}$). In the examples used herein a 32-bit CRC is used; however, this is merely exemplary and non-limiting, as CRCs with other lengths may also be implemented.

The main calculation used for CRCs is based on polynomial division, where the dividend is data with appended zeros. The remainder is the CRC value. Under binary division, 0s and 1s are the coefficients.

CRC arithmetic resides in the finite Galois field of two elements, GF (2), which is applicable because the CRC polynomial coefficients can only be a 0 or 1. As with real numbers, GF (2) properties that are similar to real numbers include communicative, associative, and distributed properties. GF (2) properties that are different from real numbers include A) every element x satisfies x+x=0 and therefore-x=x and B) every element x satisfies $x^2$=x. These properties make CRC simple to implement in hardware, where bitwise addition is computed using XOR logic and bitwise multiplication is computing using AND logic.

Figure 5:
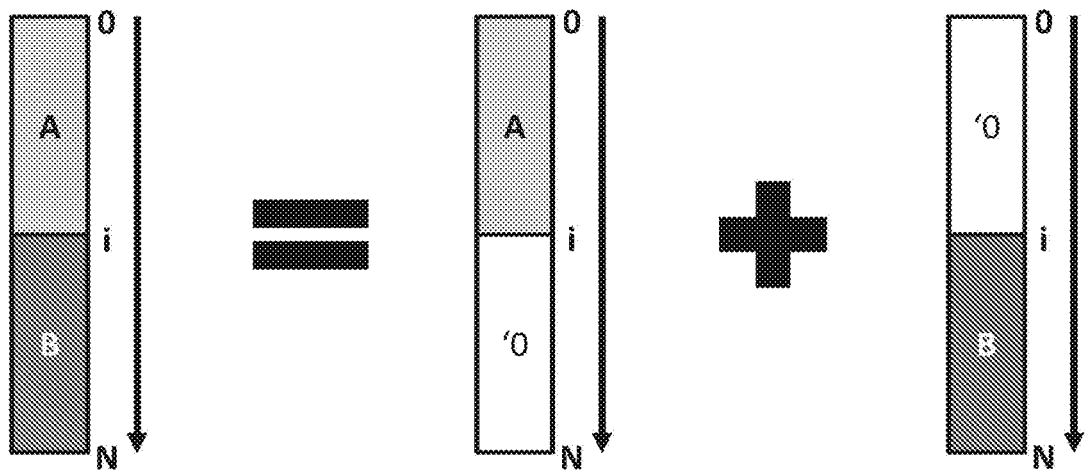
FIG. 5 is a diagram illustrating an example of CRC addition.
Figure 6:
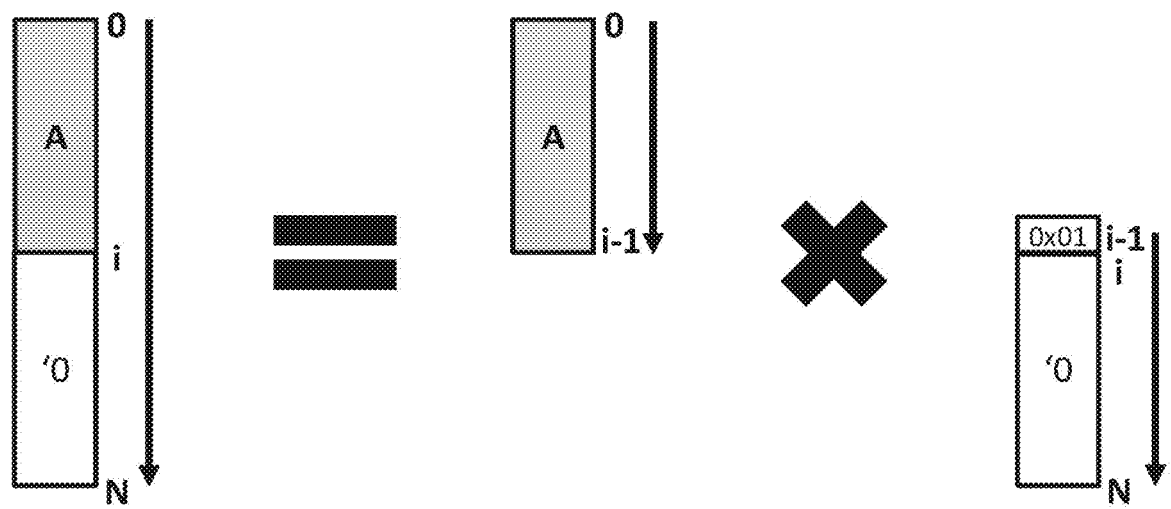
FIG. 6 is a diagram illustrating an example of CRC multiplication.
Figure 7:
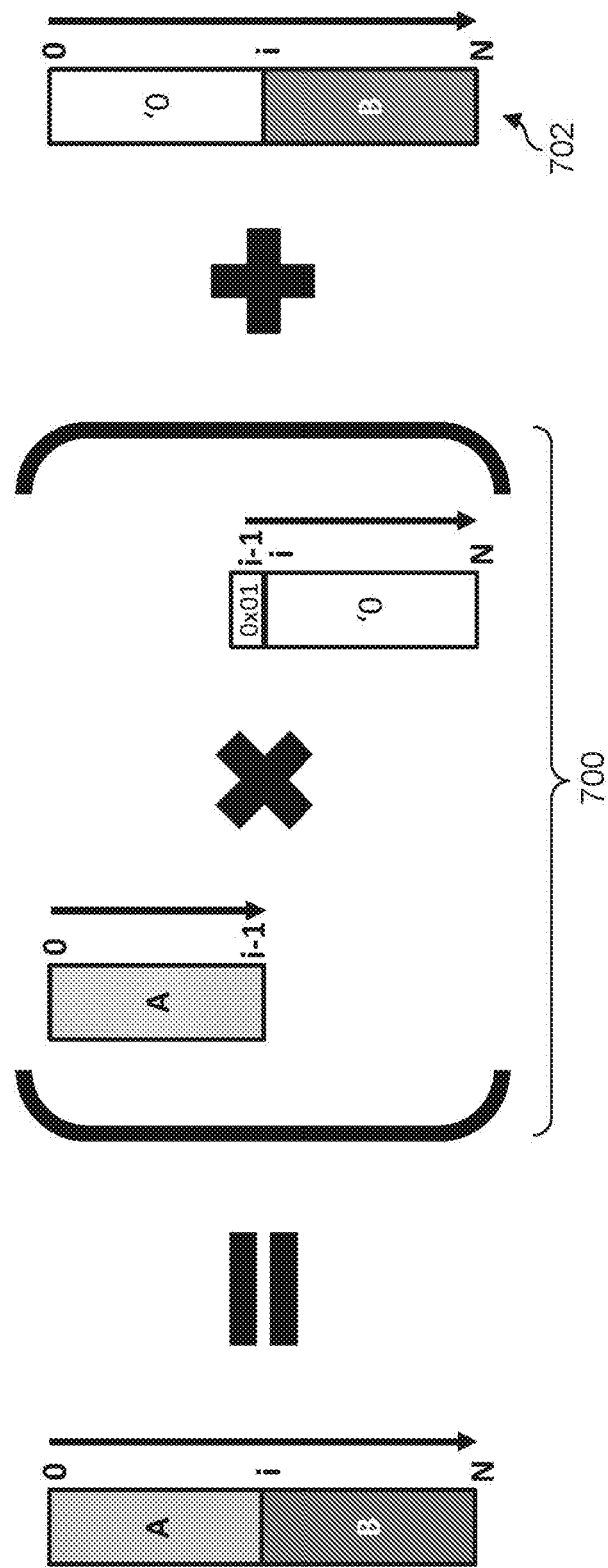
FIG. 7 is a diagram illustrating an example of CRC multiplication plus addition.

CRC addition is illustrated in FIG. 5, which depicts chunks of data 'A' and 'B', where data chunk 'A' includes bits from from 0 to i-1, and data chunk 'B' includes bits from i to N. The calculated CRC value of data of length N is equivalent to the sum (XOR) of the calculated CRC values of its components where:

zeroes replace the section of data that the component does not occupy;

the trailing zeroes with chunk 'A' is important to ensure the CRC is advanced properly; and the leading zeroes with chunk 'B' does not actually affect its CRC value CRC multiplication of is illustrated in FIG. 6. The calculated CRC value of a chunk of data advanced by length N-i is equivalent to the calculated CRC value of the chunk (without 0's appended) multiplied by the calculated CRC value of 1 advanced by length N-i. The term "advancing" here refers to appending zeros and continuing the polynomial division A combination of addition and multiplication is illustrated in FIG. 7, which is derived by combining the operations shown in FIGS. 5 and 6. In this example, data chunk 'A' is first multiplied by a chunk of zeros for bits i through N, with the bit at position i-1 being set to '1'. The result 700 is then added to data 702 comprising a chunk of 0's for bits 0 through i-1 followed by data chunk 'B'.

The register transfer language (RTL) modules (written in Verilog in one embodiment) for implementing the variable datapath with CRC module include a crc_block module, a crc_block_partial modulce, a crc_mul (multiplication) module and crc_rom (read-only memory) module and a crc_pkg. An embodiment of a crc_block module 800 is shown in FIG. 8a. crc_block module 800 computes the CRC value over the length of the input data using the follow parameters:

parameter I_BYTES=number of input data bytes parameter PAD_BYTES=+/- where the endpoint is aligned (0 means end at I_BYTE)

parameter POLY=polynomial to use (options defined in crc_pkg)

Figure 8A:
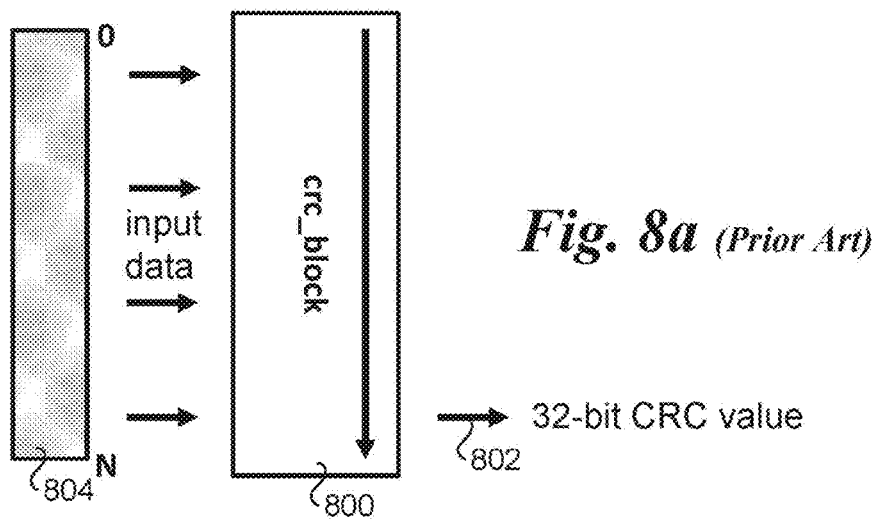
FIG. 8a is a diagram illustrating use of a crc_block module for calculating a CRC value.

As depicted in FIG. 8a, a 32-bit CRC value 802 is calculated over N bits of input data 804 during a single clock cycle.

Figure 8B:
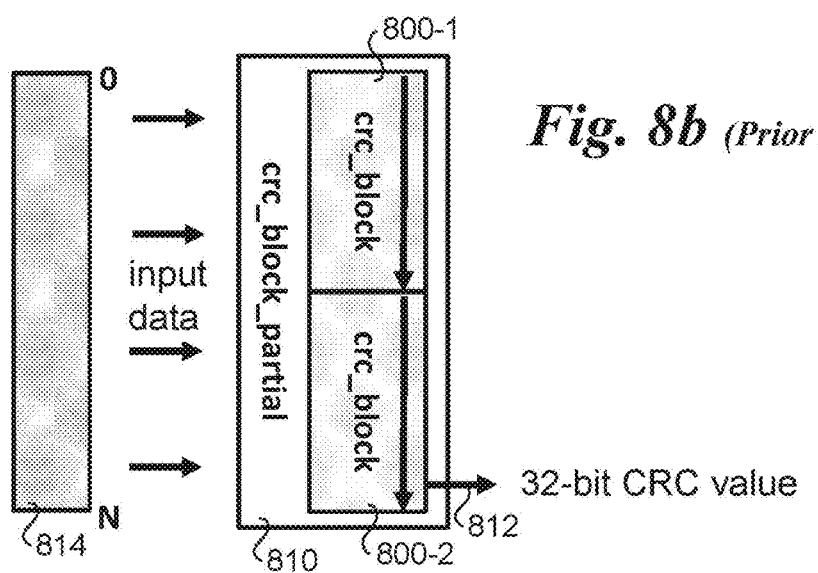
FIG. 8b is a diagram illustrating use of two crc_block modules for calculating a CRC value.

An embodiment of crc_block_partial module 810 is shown in FIG. 8b. The crc_block_partial module also computes the CRC value over the length (N) of the input data, but breaks it into multiple parts (with padding) whose results can be XOR'd in next cycle. This is useful for large data where timing is a concern. The parameters include:

parameter I_BYTES=number of input data bytes parameter O_PARTIALS=number of separate equal parts to compute parameter PAD_BYTES=+/- where the endpoint is aligned (0 means end at I_BYTE)

parameter POLY=polynomial to use (options defined in crc_pkg)

In the example shown in FIG. 8*b*, crc_block_partial module 810 includes a pair of crc_block modules 800-1 and 800-2 that are used to output a 32-bit CRC value 812 calculated over N bits of input data 814.

Figure 9:
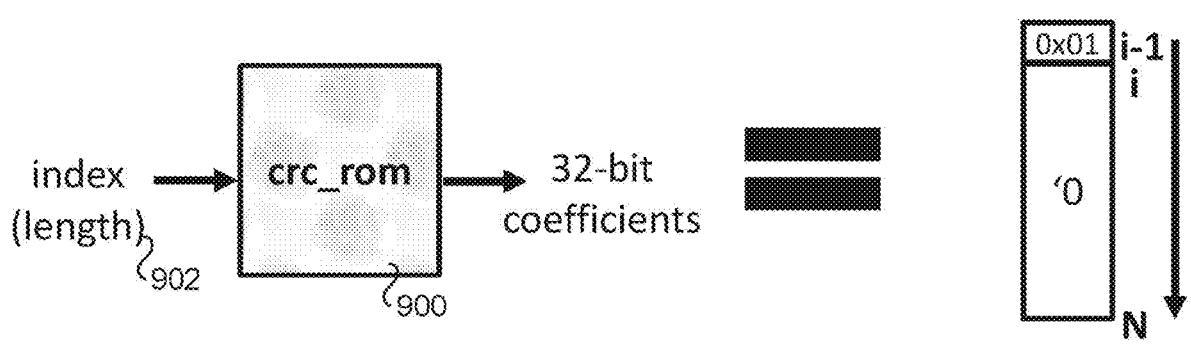
FIG. 9 is a diagram of a crc_rom module.

The crc_mul module receives data and a set of 32-bit coefficients, and outputs a multiplication product under which the data is multiplied by the 32-bit coefficient in GF (2) space. The crc_mul module is used in conjunction with the crc_module, such as depicted by crc_module 900 in FIG. 9. The crc_rom module is a lookup table in which 32-bit coefficients are stored and output based on an index length 902 (used as the lookup input). The 32-bit coefficients are then used to advance the end position of the CRC calculation. The parameters include:

parameter ENTRIES=number of table entries (remember+1 entry for 0 case)
parameter STRIDE=# of bytes per index increment
parameter OFFSET=+/− shift all index values by this offset
parameter POLY=polynomial to use (options defined in crc_pkg)

Figure 10:
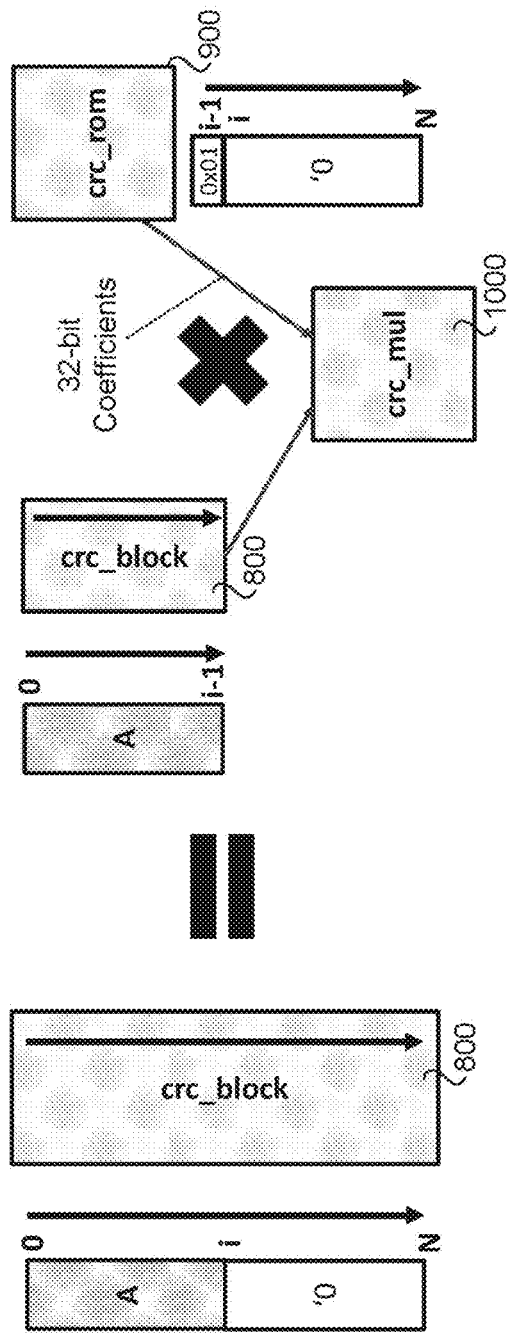
FIG. 10 is a diagram illustrating CRC multiplication using 32-bit coefficients retrieved from a crc_rom module.

FIG. 10 shows CRC multiplication using a crc_block module 800, a crc_mul module 100 and crc_rom 900. During process, a lookup is made to crc_rom 900 to obtain the 32-bit coefficients to be used by crc_mul module 1000. The CRC multiplication is then performed in a similar manner to that shown in FIG. 7.

Figure 11:
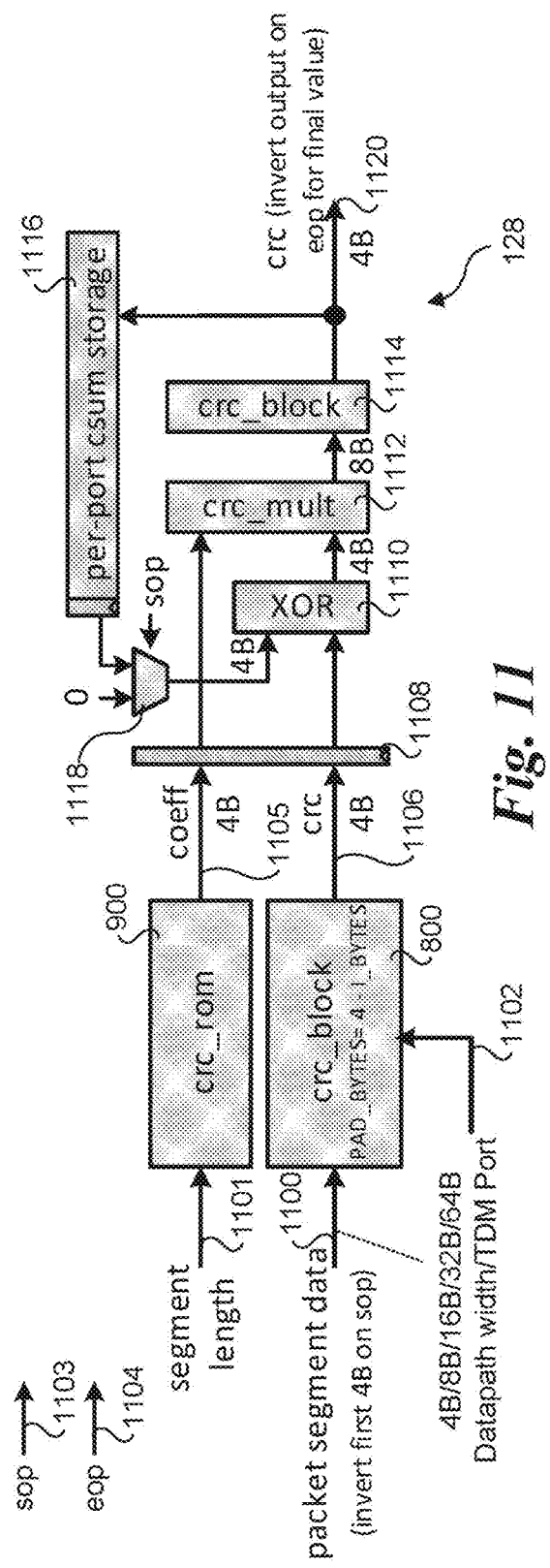
FIG. 11 is a diagram illustrating circuitry and signals for implementing a CRC module, according to one embodiment.

FIG. 11 shows an embodiment of CRC module 128. The inputs include packet segment data 1100, segment length 1101, a datapath width/TDM signal 1102, an sop signal 1103 and an eop signal 1104. Packet segment data 1100 is the packet segment data to be processed during a given cycle. For the first segment of data for a packet (which is identified by sop signal 1103), the first 4B are inverted.

The circuit components in CRC module 128 include a crc_rom 900, a crc_block module 800, a partial CRC value 1108, an XOR block 1110, a crc_mult module 112, a crc_block module 1114, per-port csum storage 1116, and a multiplexer 1118. Segment length 1101 is used as a lookup into crc_rom 900, which returns 32-bit coefficients 1105. A crc value 1106 is calculated over packet segment data 1100 us crc_block module 800 and stored as partial CRC value 1108. As depicted by per-port csum storage 1116, partial CRC values are stored on a per-port basis, enable processing of CRC values based on packets data received at multiple ports to be processed in parallel using associated TDM time slots corresponding to datapath width/TDM port signal 1102.

The contribution of each segment to the CRC is added every cycle, until the cycle with the end of packet where the output is the final CRC value 1120. The data received by crc_block module 800 is padded with a negative value so that the calculation from the current segment is aligned with the stored partial CRC value from the last cycle. Then they are summed (XOR) by XOR block 1110 and advanced using 32-bit coefficients 1105 from crc_rom 900 and crc_mult module 1112 together.

MAC/PHY Chip/module

Figure 12:
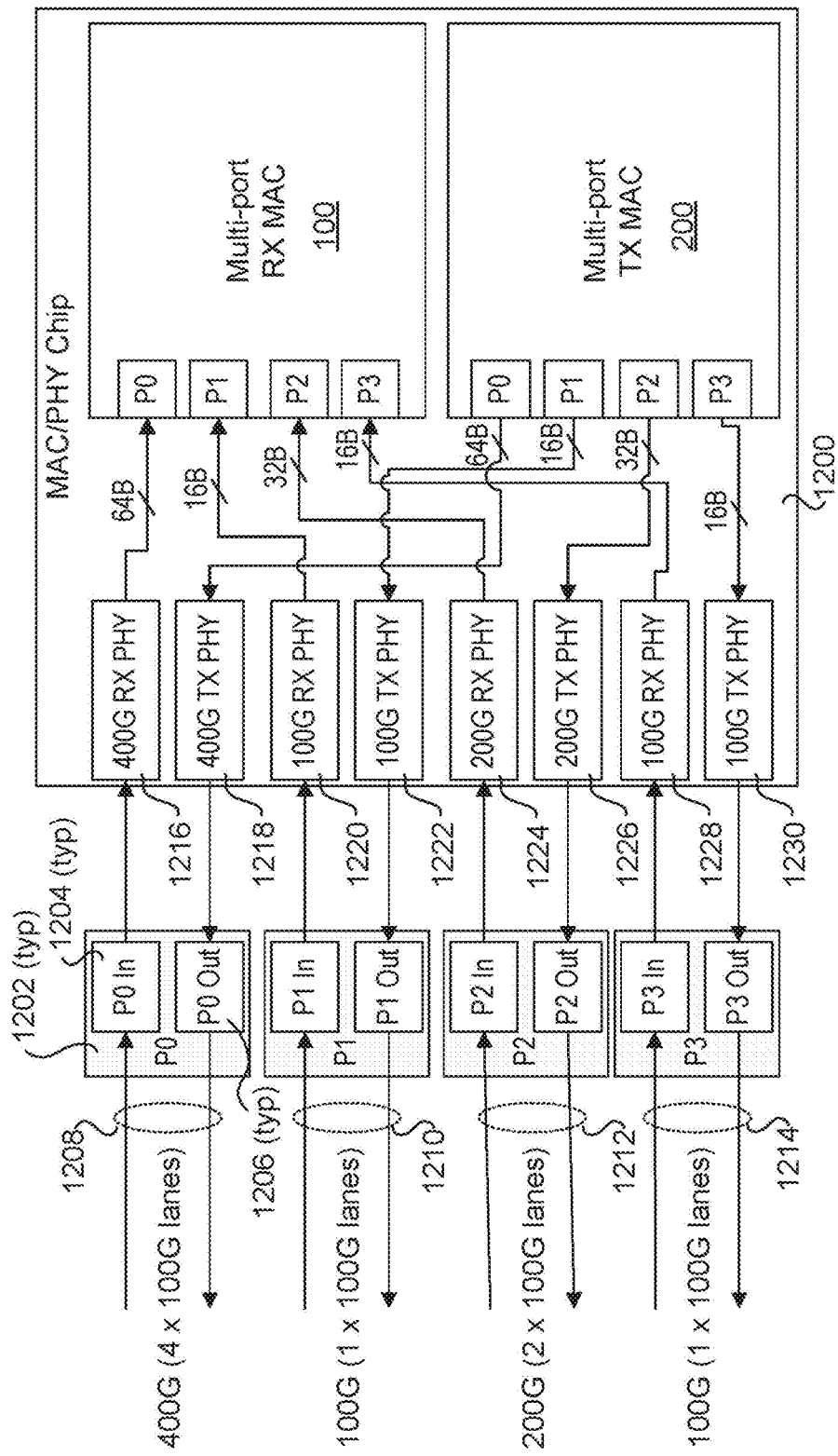
FIG. 12 is a diagram illustrating a MAC/PHY chip or module, according to one embodiment.

FIG. 12 shows a MAC/PHY chip/module 1200 comprising circuitry implemented on a discreet component (e.g., an integrated circuit "chip") or otherwise circuitry comprising a MAC/PHY module that may be embedded in a network chip, or SoC or the like. MAC/PHY chip/module 1200 includes a multi-port RX MAC block 100 and a multi-port MAC block 200 comprising circuitry and employing signals similar to that shown in FIGS. 1*a*, 1*b*, and 2. MAC/PHY chip/module 1200 is configured to be connected to a physical interface including multiple ports 1202 (P0, P1, P2, and P3), each including an input port 1204 and an output port 1206 configured to be coupled to a respective communications link.

The communication links illustrated in the embodiment of FIG. 12 are a 400G link 1208, a 100G link 1210, a 200G link 1212, and a 100G link 1214. In this example, the base PHY per lane is a 100G PHY that is used for each of 4 lanes per direction (400G), 2 lanes per direction (200G) or a single lane per direction (100G). An advantage of using the same base PHY per lane in the communication links is that the RX and TX PHY blocks can operate at the same clock frequency and employ similar circuitry, with the difference being the width of the datapath and the associate SERDES operations. In other embodiments, mixed base PHYs may be supported, such as a combination of links using a 100G base PHY per lane and a 25G base PHY per lane.

The PHYs in MAC/PHY chip/module 1200 include a 400G RX PHY 1216, a 400G TX PHY 1218, 100G RX PHYs 1220 and 1228, 100G TX PHYs 1222 and 1230, a 200G RX PHY 1224, and a 400G TX PHY 1226. Each of these RX and TX PHYs (also referred to as PHY blocks) include applicable SERDES circuitry that is not shown.

Figure 13:
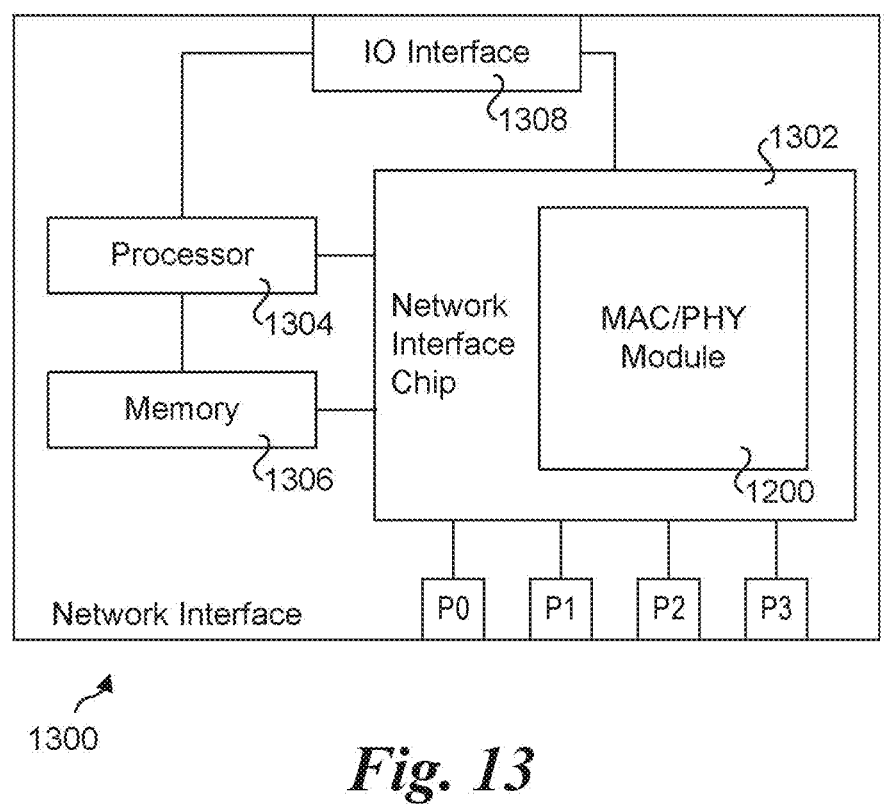
FIG. 13 is a diagram illustrating a network interface including a network interface chip including the MAC/PHY module of FIG. 12.

FIG. 13 shows an implementation of a MAC/PHY module 1200 implemented in a network interface 1300. In the illustrated embodiment network interface 1300 includes four ports P0, P1, P2, and P3 coupled to a network interface chip 1302. More generally, a network interface may include one or more ports. Network interface chip 1302 is coupled to a processor 1304, memory 1306 and an IO interface 1308.

While the data paths in some implementations are fixed in size, other product such as FPGAs that use aspects of the embodiments described above may not be fixed size. This flexibility could be used as well throughout the RX MAC and TX MAC pipelines. That is, if the MAC used enables to adjust the size of the pipeline for different ports, the logic behind the MAC (switch or fabric logic) could also use those same enables to allow cut-thru or other low latency/switching/routing features.

In the foregoing embodiments, 200G and 400G multi-port RX and TX MACs are illustrated and described. However, these are merely exemplary, as the principles and teaches provided herein may be applied to multi-port RX and TX MACs supporting a variety of total bandwidths and combinations of link bandwidths. For example, in one embodiment a 1.6 Terabit multi-port RX and TX MAC is implemented including support for communication links with lanes supporting 400G bandwidths (e.g., 1×@400G, 2×@400G, and 4×@400G).

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'n' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

Some aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. Integrated circuitry comprising:
   receive datapath circuitry that is configurable to implement multiple receive datapath configurations between, at least in part, receive Media Access Control (MAC) layer processing circuitry and receive PHY layer processing circuitry, the multiple receive datapath configurations being mutually different from each other, at least in part; and configuration selection circuitry to generate one or more input signals to be provided to the receive datapath circuitry to select which of the multiple receive datapath configurations the receive datapath circuitry is to implement;

wherein:

the multiple receive datapath configurations are associated with respective datapath widths, respective supported link speeds, and respective supported lane configurations;

the respective datapath widths comprise an 8 byte datapath width;

the respective supported link speeds comprise 100 gigabit (Gb)/second(s), 200 Gb/s, 400 Gb/s, and one or more other link speeds; and the respective supported lane configurations comprise 1 lane/link, 2 lanes/link, 4 lanes/link, and at least one other number of lanes/link.

2. The integrated circuitry of claim 1, wherein:

the one or more input signals are to be generated based, at least in part, upon control data to be provided in association with the receive PHY layer processing circuitry.

3. The integrated circuitry of claim 2, wherein:

the integrated circuitry is comprised in an integrated circuit chip.

4. The integrated circuitry of claim 3, wherein:

a system-on-chip (SoC) comprises the integrated circuit chip.

5. The integrated circuitry of claim 4, wherein:

the integrated circuitry comprises packet data processing pipeline circuitry to be used in association with the receive Media Access Control (MAC) layer processing circuitry and/or the receive PHY layer processing circuitry.

6. At least one non-transitory machine-readable storage medium storing instructions for being executed by at least one machine, the at least one machine to be associated with integrated circuitry, the instructions, when executed by the at least one machine, resulting in the integrated circuitry being configured for performance of operations comprising:

generating, by configuration selection circuitry, one or more input signals to be provided to receive datapath circuitry, the receive datapath circuitry being configurable to implement multiple receive datapath configurations between, at least in part, receive Media Access Control (MAC) layer processing circuitry and receive PHY layer processing circuitry, the multiple receive datapath configurations being mutually different from each other, at least in part, the one or more input signals to be provided to the receive datapath circuitry to select which of the multiple receive datapath configurations the receive datapath circuitry is to implement;

wherein:

the multiple receive datapath configurations are associated with respective datapath widths, respective supported link speeds, and respective supported lane configurations;

the respective datapath widths comprise an 8 byte datapath width;

the respective supported link speeds comprise 100 gigabit (Gb)/second(s), 200 Gb/s, 400 Gb/s, and one or more other link speeds; and the respective supported lane configurations comprise 1 lane/link, 2 lanes/link, 4 lanes/link, and at least one other number of lanes/link.

7. The at least one non-transitory machine-readable storage medium of claim 6, wherein:

the one or more input signals are to be generated based, at least in part, upon control data to be provided in association with the receive PHY layer processing circuitry.

8. The at least one non-transitory machine-readable storage medium of claim 7, wherein:

the integrated circuitry is comprised in an integrated circuit chip.

9. The at least one non-transitory machine-readable storage medium of claim 8, wherein:

a system-on-chip (SoC) comprises the integrated circuit chip.

10. The at least one non-transitory machine-readable storage medium of claim 9, wherein:

the integrated circuitry comprises packet data processing pipeline circuitry to be used in association with the receive Media Access Control (MAC) layer processing circuitry and/or the receive PHY layer processing circuitry.

11. A method implemented using integrated circuitry, the integrated circuitry comprising configuration selection circuitry and receive datapath circuitry, the method comprising:

generating, by the configuration selection circuitry, one or more input signals to be provided to the receive datapath circuitry, the receive datapath circuitry being configurable to implement multiple receive datapath configurations between, at least in part, receive Media Access Control (MAC) layer processing circuitry and receive PHY layer processing circuitry, the multiple receive datapath configurations being mutually different from each other, at least in part, the one or more input signals to be provided to the receive datapath circuitry to select which of the multiple receive datapath configurations the receive datapath circuitry is to implement;

wherein:

the multiple receive datapath configurations are associated with respective datapath widths, respective supported link speeds, and respective supported lane configurations;

the respective datapath widths comprise an 8 byte datapath width;

the respective supported link speeds comprise 100 gigabit (Gb)/second(s), 200 Gb/s, 400 Gb/s, and one or more other link speeds; and the respective supported lane configurations comprise 1 lane/link, 2 lanes/link, 4 lanes/link, and at least one other number of lanes/link.

12. The method of claim 11, wherein:

the one or more input signals are to be generated based, at least in part, upon control data to be provided in association with the receive PHY layer processing circuitry.

13. The method of claim 12, wherein:

the integrated circuitry is comprised in an integrated circuit chip.

14. The method of claim 13, wherein:
a system-on-chip (SoC) comprises the integrated circuit chip.

15. The method of claim 14, wherein:
the integrated circuitry comprises packet data processing pipeline circuitry to be used in association with the receive Media Access Control (MAC) layer processing circuitry and/or the receive PHY layer processing circuitry.

16. Integrated circuitry comprising:
transmit datapath circuitry that is configurable to implement multiple transmit datapath configurations between, at least in part, transmit Media Access Control (MAC) layer processing circuitry and transmit PHY layer processing circuitry, the multiple transmit datapath configurations being mutually different from each other, at least in part; and
configuration selection circuitry to generate one or more input signals to be provided to the transmit datapath circuitry to select which of the multiple transmit datapath configurations the transmit datapath circuitry is to implement;
wherein:
the multiple transmit datapath configurations are associated with respective datapath widths, respective supported link speeds, and respective supported lane configurations;
the respective datapath widths comprise an 8 byte datapath width;
the respective supported link speeds comprise 100 gigabit (Gb)/second(s), 200 Gb/s, 400 Gb/s, and one or more other link speeds; and
the respective supported lane configurations comprise 1 lane/link, 2 lanes/link, 4 lanes/link, and at least one other number of lanes/link.

17. The integrated circuitry of claim 16, wherein:
the one or more input signals are to be generated based, at least in part, upon control data to be provided in association with the transmit PHY layer processing circuitry.

18. The integrated circuitry of claim 17, wherein:
the integrated circuitry is comprised in an integrated circuit chip.

19. The integrated circuitry of claim 18, wherein:
a system-on-chip (SoC) comprises the integrated circuit chip.

20. The integrated circuitry of claim 19, wherein:
the integrated circuitry comprises packet data processing pipeline circuitry to be used in association with the transmit Media Access Control (MAC) layer processing circuitry and/or the transmit PHY layer processing circuitry.

21. At least one non-transitory machine-readable storage medium storing instructions for being executed by at least one machine, the at least one machine to be associated with integrated circuitry, the instructions, when executed by the at least one machine, resulting in the integrated circuitry being configured for performance of operations comprising:
generating, by configuration selection circuitry, one or more input signals to be provided to transmit datapath circuitry, the transmit datapath circuitry being configurable to implement multiple transmit datapath configurations between, at least in part, transmit Media Access Control (MAC) layer processing circuitry and transmit PHY layer processing circuitry, the multiple transmit datapath configurations being mutually different from each other, at least in part, the one or more input signals to be provided to the transmit datapath circuitry to select which of the multiple transmit datapath configurations the transmit datapath circuitry is to implement;
wherein:
the multiple transmit datapath configurations are associated with respective datapath widths, respective supported link speeds, and respective supported lane configurations;
the respective datapath widths comprise an 8 byte datapath width;
the respective supported link speeds comprise 100 gigabit (Gb)/second(s), 200 Gb/s, 400 Gb/s, and one or more other link speeds; and
the respective supported lane configurations comprise 1 lane/link, 2 lanes/link, 4 lanes/link, and at least one other number of lanes/link.

22. The at least one non-transitory machine-readable storage medium of claim 21, wherein:
the one or more input signals are to be generated based, at least in part, upon control data to be provided in association with the transmit PHY layer processing circuitry.

23. The at least one non-transitory machine-readable storage medium of claim 22, wherein:
the integrated circuitry is comprised in an integrated circuit chip.

24. The at least one non-transitory machine-readable storage medium of claim 23, wherein:
a system-on-chip (SoC) comprises the integrated circuit chip.

25. The at least one non-transitory machine-readable storage medium of claim 24, wherein:
the integrated circuitry comprises packet data processing pipeline circuitry to be used in association with the transmit Media Access Control (MAC) layer processing circuitry and/or the transmit PHY layer processing circuitry.

26. A method implemented using integrated circuitry, the integrated circuitry comprising configuration selection circuitry and transmit datapath circuitry, the method comprising:
generating, by the configuration selection circuitry, one or more input signals to be provided to the transmit datapath circuitry, the transmit datapath circuitry being configurable to implement multiple transmit datapath configurations between, at least in part, transmit Media Access Control (MAC) layer processing circuitry and transmit PHY layer processing circuitry, the multiple transmit datapath configurations being mutually different from each other, at least in part, the one or more input signals to be provided to the transmit datapath circuitry to select which of the multiple transmit datapath configurations the transmit datapath circuitry is to implement;
wherein:
the multiple transmit datapath configurations are associated with respective datapath widths, respective supported link speeds, and respective supported lane configurations;
the respective datapath widths comprise an 8 byte datapath width;
the respective supported link speeds comprise 100 gigabit (Gb)/second(s), 200 Gb/s, 400 Gb/s, and one or more other link speeds; and the respective supported lane configurations comprise 1 lane/link, 2 lanes/link, 4 lanes/link, and at least one other number of lanes/link.

27. The method of claim 26, wherein:
the one or more input signals are to be generated based, at least in part, upon control data to be provided in association with the transmit PHY layer processing circuitry.

28. The method of claim 27, wherein:
the integrated circuitry is comprised in an integrated circuit chip.

29. The method of claim 28, wherein:
a system-on-chip (SoC) comprises the integrated circuit chip.

30. The method of claim 29, wherein:
the integrated circuitry comprises packet data processing pipeline circuitry to be used in association with the transmit Media Access Control (MAC) layer processing circuitry and/or the transmit PHY layer processing circuitry.

* * * * *